US011618047B2

(12) United States Patent
Li et al.

(10) Patent No.: US 11,618,047 B2
(45) Date of Patent: Apr. 4, 2023

(54) LOW-COST INTELLIGENT INTEGRATED SPRAYING PRESSURE AND FLOW DETECTION DEVICE AND METHOD

(71) Applicant: Jiangsu University, Jiangsu (CN)

(72) Inventors: Jinyang Li, Jiangsu (CN); Yunfei Chen, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/604,445

(22) PCT Filed: Apr. 13, 2021

(86) PCT No.: PCT/CN2021/086751
§ 371 (c)(1),
(2) Date: Oct. 18, 2021

(87) PCT Pub. No.: WO2021/258815
PCT Pub. Date: Dec. 30, 2021

(65) Prior Publication Data
US 2022/0280964 A1 Sep. 8, 2022

(30) Foreign Application Priority Data
Jun. 22, 2020 (CN) .......................... 202010573667.6

(51) Int. Cl.
B05B 12/08 (2006.01)
B05B 1/30 (2006.01)

(52) U.S. Cl.
CPC ............. B05B 12/085 (2013.01); B05B 1/30 (2013.01)

(58) Field of Classification Search
CPC ....... B05B 12/085; B05B 1/30; B05B 9/0423; B05B 9/06; B05B 9/0413; B05B 1/08
See application file for complete search history.

(56) References Cited

U.S. PATENT DOCUMENTS 5,861,556 A * 1/1999 Nukui .................. G01F 1/3209
73/204.17
6,003,383 A * 12/1999 Zielinska ............. G01F 1/3218
73/861.22

(Continued)

FOREIGN PATENT DOCUMENTS

CN 201152757 11/2008
CN 103163866 6/2013

(Continued)

OTHER PUBLICATIONS

"International Search Report (Form PCT/ISA/210) of PCT/CN2021/086751" dated Jul. 9, 2021, pp. 1-4.

(Continued)

Primary Examiner — Steven M Cernoch
(74) Attorney, Agent, or Firm — JCIP Global Inc.

(57) ABSTRACT

The present invention provides a low-cost intelligent integrated spraying pressure and flow detection device and method. The low-cost intelligent integrated spraying pressure and flow detection device includes an intelligent integrated pressure and flow detection device, a control unit and a calibration system. The intelligent integrated pressure and flow detection device is a device which integrates a pressure detection unit and a flow detection unit and is configured to detect pressure and flow. The control unit is connected to the intelligent integrated pressure and flow detection device and the calibration system. The calibration system is configured to simulate a working condition of the intelligent integrated pressure and flow detection device during field work.

8 Claims, 3 Drawing Sheets (a)

(b)

(56) References Cited

U.S. PATENT DOCUMENTS 6,053,053 A * 4/2000 Huotari ............... G01F 1/3287
73/861.24
2014/0299673 A1 10/2014 Grimm et al.

FOREIGN PATENT DOCUMENTS

| CN | 104082267 | 10/2014 |
| CN | 104148217 | 11/2014 |
| CN | 104170811 | 12/2014 |
| CN | 106150997 | 11/2016 |
| CN | 106871977 | 6/2017 |
| CN | 110352931 | 10/2019 |
| CN | 111841938 | 10/2020 |

OTHER PUBLICATIONS

"Written Opinion of the International Searching Authority (Form PCT/ISA/237) of PCT/CN2021/086751," dated Jul. 9, 2021, pp. 1-5.

* cited by examiner (a)

(b)

LOW-COST INTELLIGENT INTEGRATED SPRAYING PRESSURE AND FLOW DETECTION DEVICE AND METHOD

CROSS-REFERENCE TO RELATED APPLICATION

This application is a 371 of international application of PCT application serial no. PCT/CN2021/086751, filed on Apr. 13, 2021, which claims the priority benefit of China application no. 202010573667.6, filed on Jun. 22, 2020. The entirety of each of the above mentioned patent applications is hereby incorporated by reference herein and made a part of this specification.

BACKGROUND

Technical Field

The present invention relates to a low-cost intelligent integrated spraying pressure and flow detection device and method, and belongs to the field of intelligent agricultural machinery.

Description of Related Art

Stable control of pressure and flow is the key to ensure the uniformity of droplet deposition and dosage-variable application during operation of sprayers. Accurate and real-time detection of pressure and flow is the prerequisite for achieving the stable control over pressure and flow. Conventional sprayers adopt independent pressure and flow sensors for flow and pressure detection. Such a configuration leads to defects such as incompact structure, complex pipelines, and complex wiring of sensors. In addition, most of the flow and pressure sensors adopted in the conventional sprayers are industrial sensors. Due to the complexity of the sprayers' operating environment, the flow and pressure sensors that meet the industrial standards show a reduction in detection performance and suffer frequent occurrence of failure during operation of the sprayers. Moreover, in order to accurately control the pressure and flow of each spray zone, conventional boom sprayers require sensors in every spray zone. As the boom sprayers are developing toward a longer range, boom sprayers with a range of 40-60 m has emerged on the market. If industrial pressure and flow sensors need to be installed in each zone of such a sprayer, the costs will be greatly increased and the market competitiveness will be reduced. To this end, an integrated pressure and flow detection device or sensor for agricultural use, for example, is of great significance to improve the pressure and flow detection performance of the sprayer and reduce the failure rate, costs, as well as the installation space required. However, there is still a lack of a special integrated sprayer flow and pressure detection device suitable for agricultural environments. Therefore, there is an urgent need to develop a low-cost intelligent integrated pressure and flow detection device and method for agricultural environments.

No intelligent integrated pressure and flow detection device or method specially used for sprayers has been proposed in the prior art. Among similar technologies, Patent 1 "Compound flow pressure sensor device (Application No. CN201611241918.0)" discloses a compound flow pressure sensor device. The sensor includes an orifice flowmeter and a pressure measurement unit installed on a rotating plate. In the sensor device, a micro-stepping motor is installed on the outer side of the main body to control the flow rate, which leads to high costs and a large size of the sensor as well high requirements on the installation space, making it inconvenient to install the sensor device on a sprayer. In addition, the orifice flowmeter used as the flow sensor part integrated in this sensor has disadvantages such as low measurement precision, great pressure loss, and inability to adapt to dirty environments, making the sensor not suitable for use in agricultural machinery. Patent 2 "Turbine flowmeter with pressure and temperature detection (Application No. CN200720174983.6)" discloses a turbine flowmeter with temperature and pressure measurement, which includes an integrated sensor, a connector, and an intelligent integrating instrument. The body of the integrated sensor is assembled with a pressure sensor, a turbine flowmeter chip, a flow sensor and a temperature sensor, to provide both pressure and temperature detection functions. However, the pressure sensor, the turbine flowmeter chip, the flow sensor and the temperature sensor adopted are conventional sensors, and limited by the structures and sizes of these sensors, the integrated sensor has a large size and is not easy to be integrated into a sprayer. In addition, the sensors adopted are industrial sensors, and will have a significant reduction in performance or even cannot function when applied in a sprayer due to the complex and changing agricultural environments.

SUMMARY

In order to make up for the above shortcomings, the present invention comprehensively considers the operating pressure and flow ranges of the sprayer, convenience in installation, and the operating environment of the sprayer, and proposes a low-cost intelligent integrated spraying pressure and flow detection device and method suitable for agricultural environments, laying a foundation for real-time detection and control over the flow and pressure of the sprayer.

The practical work needs to take into consideration not only the structural design of the intelligent integrated pressure and flow detection device, but also the calibration of the sensor and the post-processing of signals. How to send the signals to the operating room and display the boom pressure and flow data detected in real time is also an important feature of the present invention.

To solve the above problems, the following technical solutions are employed in the present invention: A low-cost intelligent integrated spraying pressure and flow detection device, including an intelligent integrated pressure and flow detection device 33, a control unit 26 and a calibration system, wherein the intelligent integrated pressure and flow detection device 33 is a device which integrates a pressure detection unit 18 and a flow detection unit 19 and is configured to detect pressure and flow of a sprayer; and the control unit 26 is connected to the intelligent integrated pressure and flow detection device 33 and the calibration system, and under the action of the control unit, the calibration system is configured to simulate changes in working parameters of the intelligent integrated pressure and flow detection device 33 during field work.

Further, the control unit 26 includes a controller 25, an analog quantity acquisition module 20, a USB flash drive 13, a touch screen 14, a DC boost module 16 and a 12V DC power supply 17; and the controller 25 is connected to the analog quantity acquisition module 20, the touch screen 14 and the DC boost module 16, the analog quantity acquisition module 20 is connected to a pressure detection unit 18 and a flow detection unit 19, the touch screen 14 is connected to the USB flash drive 13, and the boost module 16 is connected to the 12V DC power supply 17.

Further, the intelligent integrated pressure and flow detection device 33 includes an intelligent integrated pressure and flow detection device housing 1, expansion rings 2, front and rear guide elements 3, ball bearings 4, bearings 5, a preamplifier 6, a shaft 7, an impeller 8, a CYT 101 pressure transmitter 9 and connecting holes 10; the intelligent integrated pressure and flow detection device housing 1 is of a tubular shape in left-right symmetry and includes a flange formed on each of two ends thereof, the flanges at the two ends are connected to a boom sprayer pipeline, end surfaces of the flanges at the two ends are respectively formed with annular rectangular grooves for mounting the expansion rings 2 and the front and rear guide elements 3, a boss is provided on an outer housing circumference of an end surface of the intelligent integrated pressure and flow detection device housing 1, the boss is threadedly connected to the CYT 101 pressure transmitter 9, and the preamplifier 6 is threadedly connected to a middle position directly under the intelligent integrated pressure and flow detection device housing 1; top portions of the front and rear guide elements 3 are respectively provided with circular cones which are axially opposite to each other and configured for mounting the bearings 5 and the ball bearings 4, the circular cones are fixed at top ends of the front and rear guide elements 3 by an upper support column and a lower support column, a cylindrical bottom of each of the circular cones is formed with two coaxial stepped holes which are a first stepped hole 11 and a second stepped hole 12, the first stepped hole 11 is in interference fit with an outer race of the bearing 5, and the second stepped hole 12 is in clearance fit with the ball bearing 4; an end of the ball bearing 4 is in contact with an end of the shaft 7 to bear an axial force generated when the impeller 8 is driven by a liquid to rotate; an inner bore of the bearing 5 is in clearance fit with the shaft 7 so that the shaft 7 is configured for rotating along a circumferential direction; and the shaft 7 is a stepped shaft and includes a step portion which is in transition fit with an inner bore of the impeller 8.

Further, the expansion ring 2 is made of bronze and has a beveled edge, one expansion ring 2 is mounted in each of the grooves formed on left and right sides of the housing, the expansion ring 2 has an end surface fitting to the formed groove and the other end surface fitting to an end surface at the bottom of one of the front and rear guide elements 3, and the expansion rings 2 are configured to expand to form a seal, so that the front and rear guide elements 3 fit to surfaces of the formed grooves, to prevent the front and rear guide elements 3 from undergoing axial movement during operation.

Further, the front and rear guide elements 3 are made of a non-magnetically-conductive aluminum alloy by casting, are distributed at two ends of the shaft 7, and are each in the shape of an annular cylindrical hole formed by rotating the letter "L", the top of the annular cylindrical hole is provided with a coaxial circular cone which is fixed by an upper support column and a lower support column, the L-shaped annular cylindrical hole, the circular cone, and the support columns are integrally cast.

The first stepped hole 11 has a diameter of 10 mm and a depth of 10 mm, the second stepped hole has a diameter of 9 mm and a depth of 4 mm, and while keeping the cylindrical part of the circular cone unchanged, excess material is removed from the conical part of the circular cone during casting to reduce the weight of the intelligent integrated pressure and flow detection device.

Further, the preamplifier 6 includes a permanent magnet, an iron core, a coil, and an amplifying and shaping circuit which are integrally packaged, is connected to the intelligent integrated pressure and flow detection device housing 1 through M15 threads in the middle of a bottom surface of the housing, and outputs, through a lead, electrical signals generated by periodically cutting the magnetic lines of force, and four pins at a bottom end of the packaged preamplifier 6 respectively correspond to a signal output, a power input, a shielding grid and an amplifier ground wire.

Further, the calibration system includes the intelligent integrated pressure and flow detection device 33, a one-way valve 39, a filter 37, a flow regulating valve 31, a proportional relief valve 29, a pressure regulating valve 30, a pump 28, a water tank 27, a nozzle 38, a solenoid valve 34, a CYT 101 pressure transmitter 32, a measuring cylinder 35 and an electronic balance 36; the proportional relief valve 29, the CYT 101 pressure transmitter 32, the pump 28, the flow regulating valve 31 and the solenoid valve 34 are all connected to the control unit 26;

the water tank 27 includes a water outlet and a reflux inlet respectively provided at the bottom thereof and at a particular height position on a side thereof and includes a water feeding port provided right in the middle of the top thereof; the water tank 27 is connected to an liquid inlet of the pump 28 through the water outlet at the bottom, the filter 37 is disposed between the water outlet at the bottom of the water tank 27 and the pump 28, and the water tank 27 is connected to the proportional relief valve 29 through the reflux inlet on the side; a liquid outlet of the pump 28 is connected to an end of the proportional relief valve 29 and the pressure regulating valve 30 respectively by pipelines; the pressure regulating valve 30 is connected to a valve end of the flow regulating valve 31, and is configured to control a pressure difference between the proportional relief valve 29 and the flow regulating valve 31 and keep a pressure of liquid outputted from a fixed-difference relief valve at a constant value; the flow regulating valve 31 is connected to the one-way valve 39; and a water inlet end of the intelligent integrated pressure and flow detection device 33 is connected to the CYT 101 pressure transmitter 32 and the one-way valve 39, the other end of the intelligent integrated pressure and flow detection device 33 is connected to the solenoid valve 34, the solenoid valve 34 is connected to the nozzle 38 in series, the controller 25 is configured to switch the solenoid valve 34 on or off at high speed to control a working status of the nozzle 38, the nozzle 38 operates when the solenoid valve 34 is on, the nozzle 38 stops operating when the solenoid valve 34 is off, and the measuring cylinder 35 and the electronic balance 36 are disposed below the nozzle 38.

According to the low-cost intelligent integrated spraying pressure and flow detection device and method of the present invention, the principle of flow detection is as follows: When a measured fluid flows through the intelligent integrated pressure and flow detection device, the impeller is forced to rotate under the action of the fluid. The rotational speed of the impeller is proportional to the average flow rate of the fluid. At the same time, the impeller periodically cuts magnetic field lines generated by an electromagnet to change the magnetic flux of the coil. According to the principle of electromagnetic induction, an electric pulse signal will be induced in the coil. The frequency of the electric pulse signal is proportional to the flow rate of the measured fluid. After the electric pulse signal is amplified and shaped, a continuous rectangular pulse wave with a particular amplitude can be formed. A pulse frequency $f$ within a particular flow range is proportional to an instantaneous flow Q of a turbine flowmeter, i.e., $$Q = 3600 \times \frac{f}{k} \quad (1)$$

where: f is the pulse signal (Hz), and k is an instrument coefficient (1/m³). It can be obtained from calibration results that if the unit is 1/L, $$Q = 3.6 \frac{f}{k},$$

where Q is the instantaneous flow rate (m³/h) of the fluid (in an operating state), and 3600 is a conversion factor.

The pressure of the spraying agent is detected using a commercially available cost-effective piezoresistive pressure sensor. According to the principle of piezoresistive effect, the change in the pressure of the spraying agent causes the change in the resistance of the substrate sheet. Through signal conversion and calibration, a mathematical model of the pressure of the spraying agent and the electrical parameters of the sensor is obtained, thereby realizing real-time and accurate detection of the pressure of the spraying agent.

A low-cost intelligent integrated spraying pressure and flow detection method includes the following steps:

step 1: acquisition of calibration data of an intelligent integrated pressure and flow detection device, including:

calibrating the intelligent integrated pressure and flow detection device before being used to detect flow and pressure in a pipeline of a sprayer, wherein considering that pressure and flow ranges of a spraying agent are respectively 0.3-0.5 Mpa and 1-3 L/min during operation of the sprayer, operating ranges for pressure and flow of the spraying agent in the sprayer need to fall within calibration ranges selected during the calibration process, to ensure that the calibrated pressure and flow ranges meet operating requirements of the sprayer, where specific calibration steps include:

1) replacing a spraying agent in a spray boom with water, storing water in a water tank in advance, setting a proportional relief valve to 0.5 Mpa, water being driven by a pump to flow from the water tank into a main pipeline and then flow through a pressure regulating valve, a flow regulating valve, a one-way valve and the intelligent integrated pressure and flow detection device, and adjusting the pressure regulating valve to change a pressure difference between two ends thereof, wherein the flow regulating valve is configured to change a flow rate of the water passing through the intelligent integrated pressure and flow detection device in the pipeline to and keep at a stable value;

2) under a preset pressure condition, controlling the degree of opening of the flow regulating valve to gradually decrease from 100% to 10% at a step length of 5%, continuously spraying for 30 s at each degree of opening, and at the same time respectively using a 2000 mL measuring cylinder and an electronic balance precise to ±0.1 g to record a volume and mass of water sprayed from a nozzle, and recording a corresponding rectangular wave signal frequency f outputted from a preamplifier in a flow detection unit; in a similar way, controlling the degree of opening of the flow regulating valve to gradually increase from 10% to 100% at a step length of 5% and obtaining reverse stroke data; repeating the forward and reverse strokes three times respectively, recording data acquired, and storing the data in a USB flash drive;

3) at a preset degree of opening of the flow regulating valve, setting a maximum pressure of the proportional relief valve to 0.5 Mpa, manually adjusting the pressure regulating valve to gradually increase a set pressure value from 0.1 Mpa to 0.5 Mpa at a step length of 0.05 Mpa, and spraying for 30 s; in a similar way, setting a maximum pressure of the proportional relief valve to 0.5 Mpa, manually adjusting the pressure regulating valve to gradually decrease the set pressure value from 0.5 Mpa to 0.1 Mpa at a step length of 0.05 Mpa, and obtaining reverse stroke data; repeating the forward and reverse strokes three times respectively, so that an electrical signal outputted from a pressure detection unit in the intelligent integrated pressure and flow detection device and values outputted from an already calibrated CYT 101 pressure transmitter are detected by changing the pressure in the pipeline under the same flow rate, and storing the data in the USB flash drive;

step 2: anti-interference processing and curve fitting of the calibration data of the intelligent integrated pressure and flow detection device, wherein because noise exists during the acquisition of the data signals in the step 1, anti-interference processing is adopted to eliminate the noise generated during the acquisition of the data signals, and the data signals having been subjected to anti-interference processing are fitted, to obtain a mathematical relationship model between the outputted electrical signal quantity and the pressure and flow to be measured; the step 2 includes:

1) filtering and analyzing the data acquired in the step 1 by using limiting filtering, median filtering and moving average filtering methods, and removing singular value data that is acquired due to interference by vibration of a calibration system of the intelligent integrated pressure and flow detection device, interference by instantaneous impact when a valve port is opened, interference by integrated installation of the pressure detection unit and the flow detection unit and other interference during the signal data acquisition process, to obtain reliable and real valid data;

2) because through the principle of the flow detection unit of the intelligent integrated pressure and flow detection device, it can be known that after an electric pulse signal is amplified and shaped, a continuous rectangular pulse wave with a particular amplitude can be formed, and a pulse frequency f within a particular flow range is proportional to an instantaneous flow Q of a turbine flowmeter, recording a volume and mass of water sprayed from the nozzle to calculate a value of the flow Q in the sprayer pipeline in a case of continuously operating for 30 s, calculating a value of an instrument coefficient k according to a rectangular pulse wave signal frequency f outputted after anti-interference processing, so as to obtain a mathematical model of the rectangular wave signal frequency f outputted by the preamplifier and the flow Q in the pipeline, wherein the actual mathematical model obtained by calibration has some differences but does not affect the proportional relation between the output frequency f and the flow Q in the principles, and storing the mathematical model in a controller;

3) using a least square method to eliminate a data signal detection error of the CYT 101 pressure transmitter on the intelligent integrated pressure and flow detection device caused by the integrated installation of the pressure detection unit and the flow detection unit on the intelligent integrated pressure and flow detection device, to obtain a mathematical model of the output signal of the intelligent integrated pressure and flow detection device and the pressure in the spray boom pipeline, specifically implemented in the following manner:

assuming that an output value of the already calibrated CYT 101 pressure transmitter installed in the calibration pipeline is $Y_i$ (i=1, 2, . . . , 150), wherein $Y_i$ is a pressure value in the sprayer pipeline that is outputted by the already calibrated CYT 101 pressure transmitter, and an electrical signal having been subjected to linear transformation and anti-interference processing that is outputted by the pressure detection unit in the intelligent integrated pressure and flow detection device is $X_j$ (j=1, 2, . . . , 150), fitting $Y_i$ and $X_j$ using a least square method, to establish a mathematical model of the electrical signal outputted by the pressure detection unit and the pressure value in the pipeline, and storing the mathematical model in the controller;

step 3: real-time acquisition of pressure and flow data in the sprayer pipeline, including:

installing the intelligent integrated pressure and flow detection device in the sprayer pipeline, moving the sprayer to a crop field, turning on a control unit to start the spray boom to perform a spraying test at different spraying flow rates and spraying pressures, transmitting real-time data signals from the pressure detection unit and the flow detection unit to the controller through leads, storing data in the USB flash drive, and then performing anti-interference processing on the signal data stored in the USB flash drive;

step 4: anti-interference processing of the real-time detected pressure and flow data in the sprayer pipeline, including:

filtering and analyzing the data acquired in the step 3 by using limiting filtering, median filtering and moving average filtering methods, and removing singular value data that is acquired due to interference by vibration of the sprayer during field work, interference by shaking of the sprayer during traveling on uneven roads in the field and other interference, to obtain reliable and real valid data; and step 5: display and storage of the real-time detected pressure and flow data in the sprayer pipeline, including:

after the data having been subjected to anti-interference processing in the step 4 is sent to the control unit, calculating pressure and flow data of the sprayer during field work according to the mathematical model of the output signal and the pressure and flow of the sprayer obtained by the calibration system, sending the pressure and flow data to a touch screen for display, and storing the data displayed in real time on the touch screen in the USB flash drive, for subsequent analysis of stability of the sprayer during field work after the operation is complete.

Beneficial Effects of the Present Invention (1) Compared with the conventional methods for detecting flow and pressure of a spray boom of a sprayer, the intelligent integrated pressure and flow detection device of the present invention can realize accurate and real-time detection of the pressure and flow of the liquid in the spray boom during the operation of the sprayer.

(2) Compared with the conventional methods where the flow and pressure of a spray boom of a sprayer are detected using separate industrial sensors, the present invention has the advantages of compact structure, small size, low costs, high adaptability to agricultural environments, convenience in installation, simple wiring, easy maintenance, convenient sensor drift correction, and real-time transmission of detected data.

In the figures: 1—intelligent integrated pressure and flow detection device housing; 2—expansion ring; 3—front and rear guide elements; 4—ball bearing; 5—bearing; 6—pre-amplifier; 7—shaft; 8—impeller; 9—CYT 101 pressure transmitter; 10—connecting hole; 11—first stepped hole; 12—second stepped hole; 13—USB flash drive; 14—touch screen; 15—RS485 interface; 16—DC boost module; 17—12V DC power supply; 18—pressure detection unit; 19—flow detection unit; 20—analog quantity acquisition module; 21—A/D conversion interface A; 22—A/D conversion interface B; 23—A/D conversion interface C; 24—A/D conversion interface D; 25—controller; 26—control unit; 27—water tank; 28—pump; 29—proportional relief valve; 30—pressure regulating valve; 31—flow regulating valve; 32—CYT 101 pressure transmitter; 33—intelligent integrated pressure and flow detection device; 34—solenoid valve; 35—measuring cylinder; 36—electronic balance; 37—filter; 38—nozzle; 39—one-way valve.

DETAILED DESCRIPTION OF THE EMBODIMENTS

The embodiments of the present invention will be described in detail below with reference to the accompanying drawings.

Figure 1:
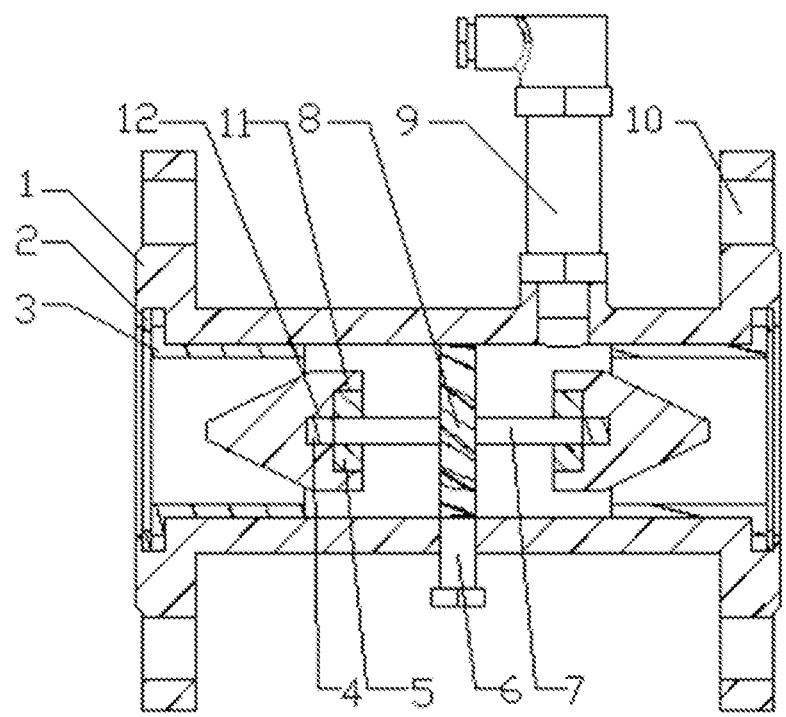
FIG. 1 is a structural diagram of an intelligent integrated pressure and flow detection device, where section (a) is a cross-sectional view and section (b) is a diagram of an internal structure.
Figure 1:
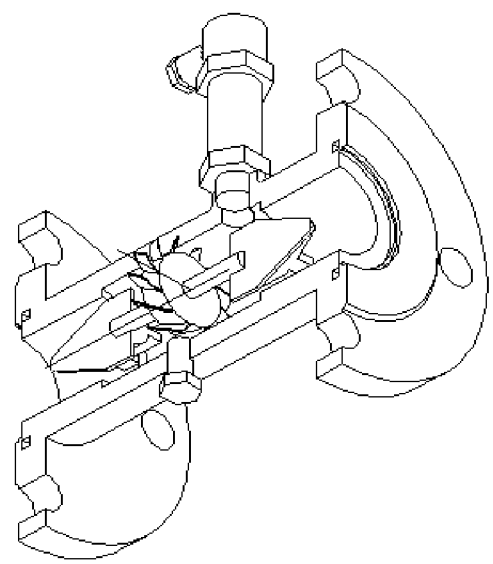

As shown in FIG. 1, an intelligent integrated pressure and flow detection device mainly includes: 1—intelligent integrated pressure and flow detection device housing; 2—expansion ring; 3—front and rear guide element; 4—ball bearing; 5—bearing; 6—preamplifier; 7—shaft; 8—impeller; 9—CYT 101 pressure transmitter; and 10—connecting hole.

The intelligent integrated pressure and flow detection device housing 1 is made of stainless steel 1Cr18Ni9Ti. The housing is of a tubular shape in left-right symmetry, and has an overall length of 190 mm, an outer diameter of 70 mm and an inner diameter of 50 mm. A flange is formed on each of two ends of the housing. The flange portion has a diameter of 150 mm and a thickness of 20 mm. Four connecting holes 10 of an equal size are arranged on the flanges, and are evenly distributed on a circumference having a diameter of 125 mm. The connecting holes 10 have a diameter of 18 mm. The intelligent integrated pressure and flow detection device 33 is threadedly connected to the boom sprayer pipeline. End surfaces of the flanges at the two ends are reamed, and the processed hole has a diameter of 60 mm and a length of 10 mm. At positions which are 4 mm distant from the end surfaces of the flanges at the two ends, annular rectangular grooves having a diameter of 70 mm and a width of 6 mm are formed, which are configured for mounting the expansion rings 2 and the front and rear guide elements 3. A boss having a diameter of 30 mm and a height of 10 mm is provided on an outer housing circumference at a position which is distant from the right end surface of the housing by 63 mm. The boss portion is formed with an M20 internal-thread through hole, so as to be threadedly connected to the CYT 101 pressure transmitter 9. An M15 threaded through hole is formed at a middle position directly under the housing, and the axis of the M15 threaded through hole is coplanar with the M20 internal threads, for the purpose of threadedly installing the preamplifier 6. The intelligent integrated pressure and flow detection device 33 can realize the pressure and flow detection functions of the pressure detection unit 18 and the flow detection unit 19.

The expansion ring 2 is made of bronze, has a beveled edge, and has a nominal size of 70 mm, width of 6 mm and thickness of 2 mm. One expansion ring 2 is mounted in each of the grooves formed on left and right sides of the housing. The expansion ring 2 has an end surface fitting to the formed groove and the other end surface fitting to an end surface at the bottom of one of the front and rear guide elements 3. The expansion rings 2 are configured to expand to form a seal, so that the front and rear guide elements 3 fit to surfaces of the formed grooves, to prevent the front and rear guide elements 3 from undergoing axial movement during operation.

The front and rear guide elements 3 are made of a non-magnetically-conductive aluminum alloy by casting, and are each in the shape of an annular cylindrical hole formed by rotating the letter "L". The top of the annular cylindrical hole is provided with a coaxial circular cone which is fixed by an upper support column and a lower support column, the L-shaped annular cylindrical hole, the circular cone, and the support columns are integrally cast. The bottom end portions of the front and rear guide elements 3 fitting the surfaces of the grooves have a diameter of 60 mm, and the front and rear guide elements 3 have an inner-hole diameter of 42 mm and a thickness of 4 mm.

Under the expansion effect of the expansion rings, an end of each of the front and rear guide elements 3 fits a respective one of the grooves, and the other end of each of the front and rear guide elements 3 fits an end surface of a respective one of the expansion rings. In the front and rear guide elements 3, the cylindrical part has a wall thickness of 4 mm, the part fitting the inner hole of the housing during installation has a diameter of 50 mm, and the inner hole part has a diameter of 42 mm and a length of 44 mm. Top portions of the front and rear guide elements 3 are respectively provided with elements which are configured for mounting the bearings 5 and the ball bearings 4. The elements form a unity with the annular cylinder, and the axes of the elements coincide with that of the annular cylinder. The elements are in the shape of circular cones (formed by rotating a right-angled trapezoid). While keeping the cylindrical part unchanged, excess material is removed from the conical part during casting to reduce the weight of the intelligent integrated pressure and flow detection device. During integral casting with the annular hole, two support columns in the same plane are cast and connected to the conical part. The circular cone has a length of 40 mm. The cylindrical part has a length of 15 mm and a diameter of 20 mm. The bottom of each circular cone is formed with two coaxial stepped holes including a first stepped hole 11 having a diameter of 10 mm and a depth of 10 mm and a second stepped hole 12 having a diameter of 9 mm and a depth of 4 mm. The first stepped hole 11 is in interference fit with an outer race of the bearing 5, and the second stepped hole 12 is in clearance fit with the ball bearing 4.

The ball bearing 4 is a standard miniature carbide thrust bearing (f-series thrust bearing) with a model F4-9M, and is in clearance fit with the second stepped hole 12. An end of the ball bearing 4 is in contact with an inner wall of the second stepped hole 12, and the other end of the ball bearing 4 is in contact with an end of the shaft 7 to bear an axial force generated when the impeller 8 is driven by a liquid to rotate.

The bearing 5 is a standard sliding bearing (hollow sleeve bearing) with a model 0810, and is installed in the first stepped hole 11. The bearing 5 is in interference fit with the first stepped hole 11, and an inner bore of the bearing 5 is in clearance fit with the shaft 7 so that the shaft 7 is configured for rotating along a circumferential direction; and The preamplifier 6 includes a permanent magnet, an iron core, a coil, and an amplifying and shaping circuit which are integrally packaged, is connected to the intelligent integrated pressure and flow detection device housing 1 through M15 threads in the middle of a bottom surface of the housing, and outputs, through a lead, electrical signals generated by periodically cutting the magnetic lines of force, and four pins at a bottom end of the packaged preamplifier 6 respectively correspond to a signal output, a power input, a shielding grid (a wire of which is connected to the intelligent integrated pressure and flow detection device housing 1) and an amplifier ground wire.

The shaft 7 is made of stainless steel 2Cr13. The shaft 7 is a stepped shaft having a length of 68 mm and a diameter of 8 mm. A step having an outer diameter of 20 mm and a width of 15 mm is formed in the middle of the shaft. Circumferential portions at two ends of the shaft 7 are respectively engaged with the bearings 5. Two end surfaces of the shaft 7 are in contact with the ball bearings 4. The stepped portion is in transition fit with an inner bore of the impeller 8.

The impeller 8 is made of a highly magnetically-permeable material Cr17Ni2. The impeller includes 12 helical blades evenly distributed on a circumference thereof, and is installed in the middle of the shaft 7. The impeller 8 has an outer race diameter of 25 mm, an inner race diameter of 20 mm, a blade height of 11.5 mm, a blade width of 15 mm, and a blade tilt angle of 30°. The inner bore of the impeller 8 is in transition fit with the stepped portion of the shaft 7.

The CYT 101 pressure transmitter 9 is a standard pressure transmitter manufactured by Beijing Tianyu Hengchuang Sensing Technology Co., Ltd., China. The CYT 101 pressure transmitter 9 is threadedly connected to the intelligent integrated pressure and flow detection device housing 1 through the M20 threaded hole formed on the intelligent integrated pressure and flow detection device housing 1.

Figure 2:
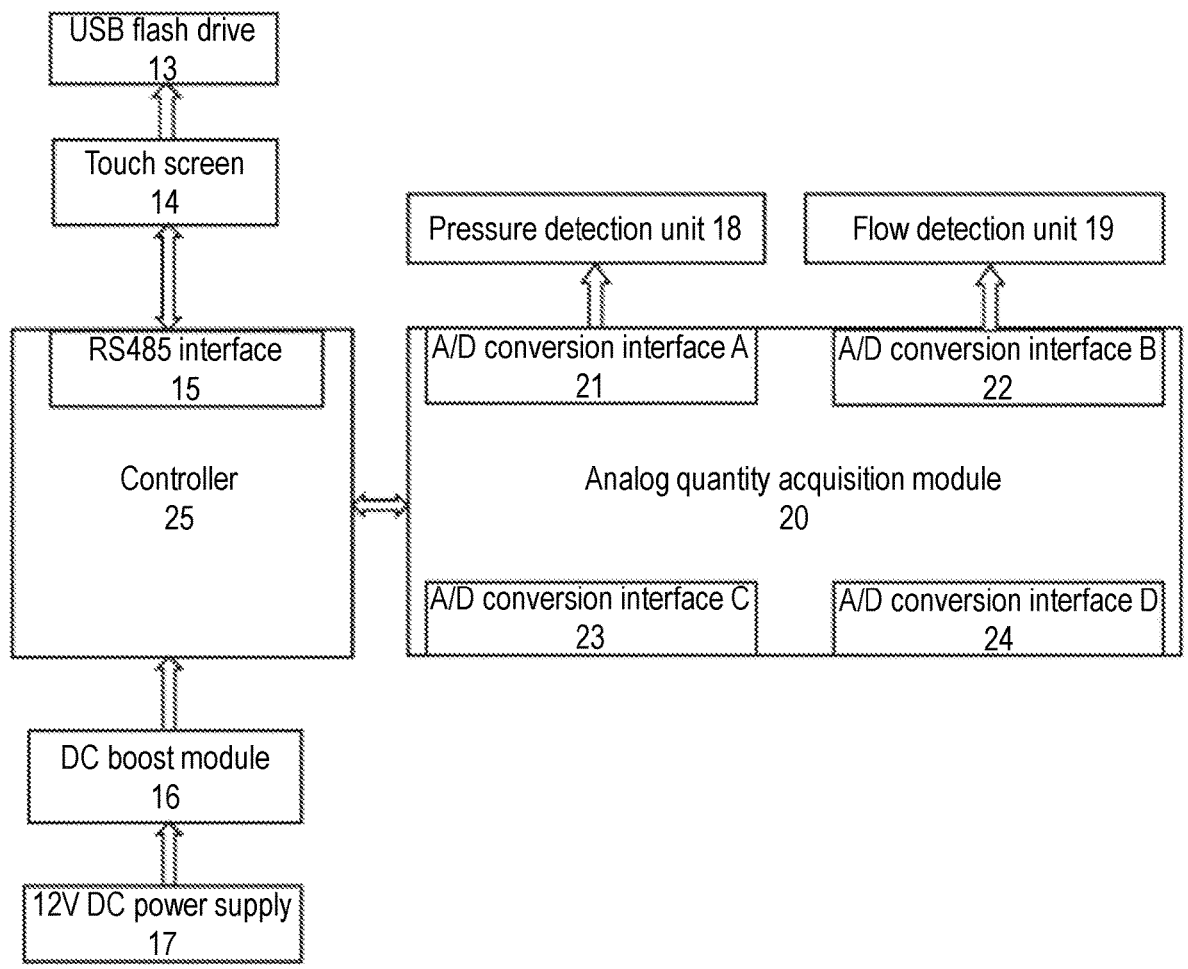
FIG. 2 is a schematic diagram of a control unit in the intelligent integrated pressure and flow detection device.

As shown in FIG. 2, the control unit 26 includes a controller 25, an analog quantity acquisition module 20, a USB flash drive 13, a touch screen 14, a DC boost module 16 and a 12V DC power supply 17.

The controller 25 is 6ES7 216-2BD23-0XB8 from Siemens which integrates an RS485 interface 15, and is connected to the analog quantity acquisition module 20 through a parallel peripheral interface (PPI).

The analog quantity acquisition module 20 is 6ES7 235-0KD22-0XB8 from Siemens which integrates four conversion interfaces: an A/D conversion interface A 21, an A/D conversion interface B 22, an A/D conversion interface C 23 and an A/D conversion interface D 24.

The touch screen 14 is a Smart IE 700 V3 touch screen from Siemens. The touch screen 14 integrates an RS485 communication interface and a USB interface. The touch screen 14 is connected to the RS485 interface 13 of the controller 25 through an RS485 bus, and is configured to display pressure data and flow data acquired in real-time in the boom sprayer pipeline.

The USB flash drive 13 is connected to the touch screen 14 through a USB interface on the touch screen 14, and is configured to store the acquired pressure and flow data in the boom sprayer pipeline.

The pressure detection unit 18 and the flow detection unit 19 are respectively connected to the A/D conversion interface A 21 and the A/D conversion interface B 22 of the analog quantity acquisition module.

The 12V DC power supply 17 is a storage battery on the sprayer to supply power to the flow detection unit 19. The DC boost module 16 is configured to convert a 12V DC voltage into a 24V DC voltage, so as to supply power to the pressure detection unit 18, the controller 25 and the touch screen 14.

The DC boost module 16 is an MDF150-12S24 boost converter.

In the low-cost intelligent integrated pressure and flow detection device and method of the present invention, the pressure detection unit 18 is a CYT 101 pressure transmitter manufactured by Beijing Tianyu Hengchuang Sensing Technology Co., Ltd., China, which is a class I standard pressure transmitter and is threadedly connected to the intelligent integrated pressure and flow detection device housing 1. During calibration, the intelligent integrated pressure and flow detection device 33 should be installed as a whole in the calibration system.

Figure 3:
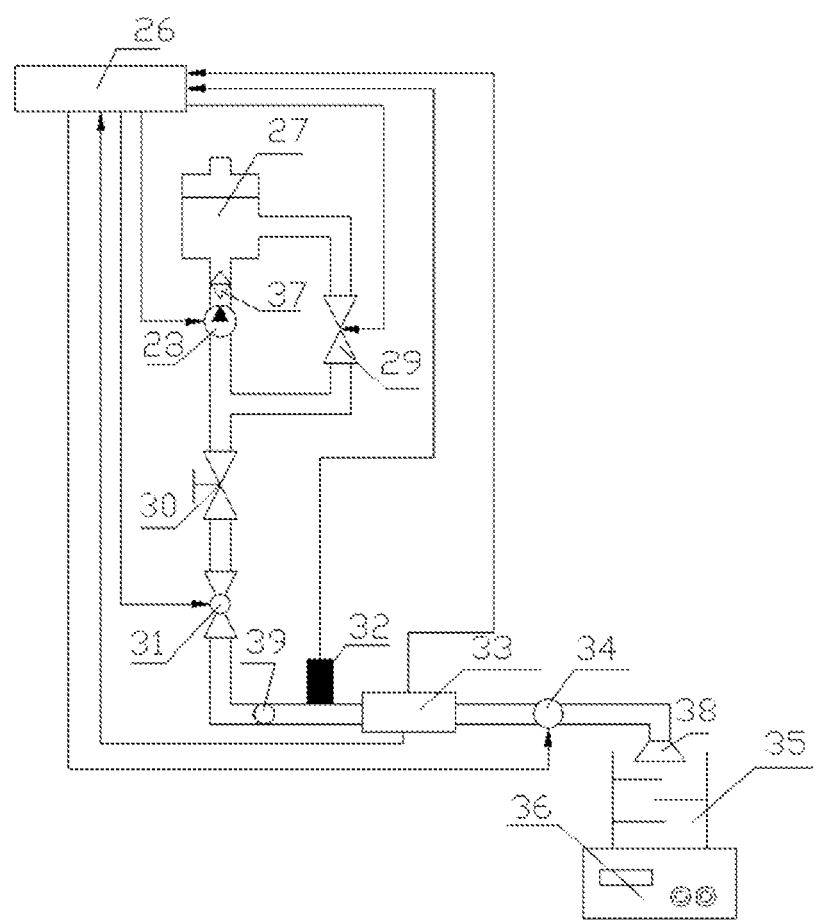
FIG. 3 is a schematic diagram showing calibration of the intelligent integrated pressure and flow detection device.

As shown in FIG. 3, the calibration system includes the intelligent integrated pressure and flow detection device 33, a one-way valve 39, a filter 37, a flow regulating valve 31, a proportional relief valve 29, a pressure regulating valve 30, a pump 28, a water tank 27, the control unit 26, a nozzle 38, a solenoid valve 34, a CYT 101 pressure transmitter 32, a measuring cylinder 35 and an electronic balance 36. The calibration system is configured to simulate a working condition of the intelligent integrated pressure and flow detection device 33 during field work.

The water tank 27 is made of opaque plastic. The water tank 27 includes a water outlet and a reflux inlet respectively provided at the bottom thereof and at a particular height position on a side thereof and includes a water feeding port provided right in the middle of the top thereof. The water tank is connected to the pump 28 through the water outlet at the bottom, and is connected to the proportional relief valve 29 through the reflux inlet on the side.

The pump 28 is an RS-360SH gear pump. A liquid inlet of the pump 28 is connected to the water outlet at the bottom of the water tank 27 by a pipeline. A liquid outlet of the pump 28 is connected to an end of the proportional relief valve 29 and the pressure regulating valve 30 respectively by pipelines.

The proportional relief valve 29 is a DBEE6-1X/50 piloted proportional relief valve manufactured by Bosch Rexroth, German, having an end connected to the reflux inlet of the water tank 27 by a pipeline and the other end connected to the pressure regulating valve 30.

The pressure regulating valve 30 is a DR20-30/31.5 piloted pressure regulating valve manufactured by Bosch Rexroth, German, having an end connected to the water outlet of the proportional relief valve 29 by a pipeline and the other end connected to a valve end of the flow regulating valve 31. The pressure regulating valve 30 is configured to control a pressure difference between the proportional relief valve 29 and the flow regulating valve 31 and keep a pressure of liquid outputted from a fixed-difference relief valve at a constant value.

The flow regulating valve 31 is a flow control valve manufactured by Bosch Rexroth, German, having an end connected to an inlet of the pressure regulating valve 30.

A water inlet end of the intelligent integrated pressure and flow detection device 33 is connected to the CYT 101 pressure transmitter 32 and the one-way valve 39, and the other end of the intelligent integrated pressure and flow detection device 33 is connected to the solenoid valve 34.

The filter 37 is installed on the main pipeline of the calibration system.

The CYT 101 pressure transmitter 32 is manufactured by Beijing Tianyu Hengchuang Sensing Technology Co., Ltd., China, is an already calibrated pressure sensor commonly used in a boom sprayer device, and is installed on the pipeline between the flow regulating valve 31 and the intelligent integrated pressure and flow detection device 33 by threaded connection.

The solenoid valve 36 is a Type 6013 direct-acting, high speed on-off solenoid valve, having an end connected to the nozzle 38 in series and the other end connected to the intelligent integrated pressure and flow detection device 33. The controller 25 is configured to switch the solenoid valve 34 on or off at high speed to control a working status of the nozzle 38. The nozzle 38 operates when the solenoid valve 34 is on. The nozzle 38 stops operating when the solenoid valve 34 is off.

The nozzle 38 is a Type TR80-05 cone nozzle manufactured by Lechler, German, and is connected to the high speed on-off solenoid valve 34 in series.

A low-cost intelligent integrated spraying pressure and flow detection method includes the following steps:

step 1: acquisition of calibration data of an intelligent integrated pressure and flow detection device, including the following:

the intelligent integrated pressure and flow detection device 33 is calibrated before being used to detect flow and pressure in a pipeline of a sprayer, wherein considering that pressure and flow ranges of a spraying agent are respectively 0.3-0.5 Mpa and 1-3 L/min during operation of the sprayer, operating ranges for pressure and flow of the spraying agent in the sprayer need to fall within calibration ranges selected during the calibration process, to ensure that the calibrated pressure and flow ranges meet operating requirements of the sprayer, where specific calibration steps include the following:

1) a spraying agent in a spray boom is replaced with water, water is stored in a water tank 27 in advance, a proportional relief valve 29 is set to 0.5 Mpa, water is driven by a pump 28 to flow from the water tank 27 into a main pipeline and then flow through a pressure regulating valve 30, a flow regulating valve 31, a one-way valve 39 and the intelligent integrated pressure and flow detection device 33, and the pressure regulating valve 30 is adjusted to change a pressure difference between two ends thereof, wherein the flow regulating valve 31 is configured to change a flow rate of the water passing through the intelligent integrated pressure and flow detection device 33 in the pipeline to and keep at a stable value;

2) under a preset pressure condition, the degree of opening of the flow regulating valve 31 is controlled to gradually decrease from 100% to 10% at a step length of 5%, spraying is continuously performed for 30 s at each degree of opening, and at the same time a 2000 mL measuring cylinder 35 and an electronic balance 36 precise to ±0.1 g are respectively used to record a volume and mass of water sprayed from a nozzle, and a corresponding rectangular wave signal frequency f outputted from a preamplifier 6 in a flow detection unit 19 is recorded; in a similar way, the degree of opening of the flow regulating valve 31 is controlled to gradually increase from 10% to 100% at a step length of 5% and reverse stroke data is obtained; the forward and reverse strokes are repeated three times respectively, data acquired is recorded, and the data is stored in a USB flash drive 13;

3) at a preset degree of opening of the flow regulating valve 31, a maximum pressure of the proportional relief valve 29 is set to 0.5 Mpa, the pressure regulating valve 30 is manually adjusted to gradually increase a set pressure value from 0.1 Mpa to 0.5 Mpa at a step length of 0.05 Mpa, and spraying is performed for 30 s; in a similar way, a maximum pressure of the proportional relief valve 29 is set to 0.5 Mpa, the pressure regulating valve 30 is manually adjusted to gradually decrease the set pressure value from 0.5 Mpa to 0.1 Mpa at a step length of 0.05 Mpa, and reverse stroke data is obtained; the forward and reverse strokes are repeated three times respectively, so that an electrical signal outputted from a pressure detection unit 18 in the intelligent integrated pressure and flow detection device 33 and values obtained by an already calibrated CYT 101 pressure transmitter 32 are detected by changing the pressure in the pipeline under the same flow rate, and the data is stored in the USB flash drive 13;

step 2: anti-interference processing and curve fitting of the calibration data of the intelligent integrated pressure and flow detection device, wherein because noise exists during the acquisition of the data signals in the step 1, anti-interference processing is adopted to eliminate the noise generated during the acquisition of the data signals, and the data signals having been subjected to anti-interference processing are fitted, to obtain a mathematical model between the outputted electrical signal quantity and the pressure and flow to be measured. The step 2 includes the following:

1) the data acquired in the step 1 is filtered and analyzed by using limiting filtering, median filtering and moving average filtering methods, and singular value data that is acquired due to interference by vibration of a calibration system of the intelligent integrated pressure and flow detection device, interference by instantaneous impact when a valve port is opened, interference by integrated installation of the pressure detection unit 18 and the flow detection unit 19 and other interference during the signal data acquisition process is removed, to obtain reliable and real valid data;

2) because through the principle of the flow detection unit 19 of the intelligent integrated pressure and flow detection device 33, it can be known that after an electric pulse signal is amplified and shaped, a continuous rectangular pulse wave with a particular amplitude can be formed, a pulse frequency f within a particular flow range is proportional to an instantaneous flow in the pipeline, a volume and mass of water sprayed from the nozzle are recorded to calculate a value of the flow Q in the sprayer pipeline in a case of continuously operating for 30 s, a value of an instrument coefficient k can be calculated according to a rectangular pulse wave signal frequency f outputted after anti-interference processing, so as to obtain a mathematical model of the rectangular wave signal frequency f outputted by the pre-amplifier and the flow Q in the pipeline, wherein the actual mathematical model obtained by calibration has some differences but does not affect the proportional relation between the output frequency f and the flow Q in the principles, and the mathematical model is stored in a controller 25;

3) a least square method is used to eliminate a data signal detection error of the CYT 101 pressure transmitter 9 on the intelligent integrated pressure and flow detection device 33 caused by the integrated installation of the pressure detection unit 18 and the flow detection unit 19 on the intelligent integrated pressure and flow detection device 33, to obtain a mathematical model expression of the output signal of the intelligent integrated pressure and flow detection device 33 and the pressure in the spray boom pipeline, specifically implemented in the following manner:

an output value of the already calibrated CYT 101 pressure transmitter 32 installed in the calibration pipeline is $Y_i$ (i=1, 2, ..., 150), wherein $Y_i$ is a pressure value in the sprayer pipeline that is outputted by the already calibrated CYT 101 pressure transmitter 32, an electrical signal having been subjected to linear transformation and anti-interference processing that is outputted by the pressure detection unit 18 in the intelligent integrated pressure and flow detection device 33 is $X_j$ (j=1, 2, ..., 150), and $Y_i$ and $X_j$ are fitted using a least square method, to establish a mathematical model of the electrical signal outputted by the pressure detection unit 18 and the pressure value in the pipeline, and the mathematical model is stored in the controller 25;

step 3: acquisition of real-time detected pressure and flow data in the sprayer pipeline, including the following:

the intelligent integrated pressure and flow detection device 33 is installed in the boom sprayer pipeline, the sprayer is moved to a crop field, a control unit 26 is turned on to start the spray boom to perform a spraying test at different spraying flow rates and spraying pressures, real-time data signals from the pressure detection unit 18 and the flow detection unit 19 are transmitted to the controller 25 through leads, data is stored in the USB flash drive 13, and anti-interference processing is performed on the signal data stored in the USB flash drive 13;

step 4: anti-interference processing of the real-time detected pressure and flow data in the sprayer pipeline, including the following:

the data acquired in the step 3 is filtered and analyzed by using limiting filtering, median filtering and moving average filtering methods, and singular value data that is acquired due to interference by vibration of the sprayer during field work, interference by shaking of the sprayer during traveling on uneven roads in the field and other interference is removed, to obtain reliable and real valid data; and step 5: display and storage of the real-time detected pressure and flow data in the sprayer pipeline, including the following:

after the data having been subjected to anti-interference processing in the step 4 is sent to the control unit 26, pressure and flow data of the sprayer during field work is calculated according to the mathematical model of the output signal and the pressure and flow of the sprayer obtained by the calibration system and is sent to a touch screen 14 for display, and the real-time data displayed on the touch screen 14 is stored in the USB flash drive 13, for subsequent analysis of stability of the sprayer during field work after the operation is complete.

An operating process of the low-cost intelligent integrated spraying pressure and flow detection device and method of the present invention is as follows:

Before the sprayer starts the spraying operation, the real-time spray boom pressure and flow detection system is started to perform a power-on self test. After the self test is passed, the touch screen 14 is used to set pressure, flow and other parameters of the spray boom during operation. Then under the action of the controller 25, through the intelligent integrated pressure and flow detection device 35, pressure and flow data during the operation of the sprayer is dynamically acquired. After anti-interference processing and data conversion are performed on the acquired data, the actual flow and pressure values during the operation of the sprayer are obtained. The detected pressure and flow values are stored in the USB flash drive 13 and displayed on the touch screen 14 in real time.

In the description of the specification, the description with reference to the terms "an embodiment", "some embodiments", "exemplary embodiments", "example", "specific example", or "some example" and so on means that specific features, structures, materials or characteristics described in connection with the embodiment or example are embraced in at least one embodiment or example of the present invention. In the present specification, the illustrative expression of the above terms is not necessarily referring to the same embodiment or example. Moreover, the described specific features, structures, materials or characteristics may be combined in any suitable manner in one or more embodiments.

Although the embodiments of the present invention have been illustrated and described above, it is to be understood by those of ordinary skill in the art that various changes, alterations, replacements and modifications can be made to these embodiments without departing from the principle and spirit of the present invention. The scope of the present invention is defined by the appended claims and equivalents thereof.

What is claimed is:

1. An integrated spraying pressure and flow detection device, comprising an integrated pressure and flow detection unit, a control unit and a calibration system, wherein the integrated pressure and flow detection unit is a device configured to detect a pressure and a flow of a sprayer; and the control unit is connected to the integrated pressure and flow detection unit and the calibration system, and under an action of the control unit, the calibration system is configured to simulate changes in working parameters of the integrated pressure and flow detection unit during a field work, wherein the integrated pressure and flow detection unit comprises an integrated pressure and flow detection device housing, expansion rings, front and rear guide elements, ball bearings, bearings, a preamplifier, a shaft, an impeller, a CYT 101 pressure transmitter and connecting holes; and the integrated pressure and flow detection device housing has a tubular shape in a left-right symmetry and comprises flanges respectively formed on two ends thereof, and the flanges at the two ends are connected to a boom sprayer pipeline, end surfaces of the flanges at the two ends are respectively formed with annular rectangular grooves for mounting the expansion rings and the front and rear guide elements, and a boss is provided on an outer housing circumference of an end surface of the integrated pressure and flow detection device housing, the boss is threadedly connected to the pressure transmitter, and the preamplifier is threadedly connected to a middle position directly under the integrated pressure and flow detection device housing; top portions of the front and rear guide elements are respectively provided with circular cones which are axially opposite to each other and configured for mounting the bearings and the ball bearings, a cylindrical bottom of each of the circular cones is formed with two coaxial stepped holes which are a first stepped hole and a second stepped hole, wherein the first stepped hole is in interference fit with an outer race of a respective one of the bearings, and the second stepped hole is in clearance fit with a respective one of the ball bearings; an end of each of the ball bearings is in contact with an end of the shaft to bear an axial force generated when the impeller is driven by a liquid to rotate; an inner bore of each of the bearings is in clearance fit with the shaft so that the shaft is configured for rotating along a circumferential direction; and the shaft is a stepped shaft and comprises a step portion which is in transition fit with an inner bore of the impeller.

2. The integrated spraying pressure and flow detection device according to claim 1, wherein the expansion rings each are made of bronze and have a beveled edge, the expansion rings are respectively mounted in the formed grooves on left and right sides of the housing, the expansion rings each have an end surface fitting to a respective one of the formed grooves and the other end surface fitting to an end surface at a bottom of a respective one of the front and rear guide elements, and the expansion rings are configured to expand to form a seal, so that the front and rear guide elements fit to surfaces of the formed grooves, respectively, to prevent the front and rear guide elements from undergoing axial movement during operation.

3. The integrated spraying pressure and flow detection device according to claim 1, wherein the front and rear guide elements are made of a non-magnetically-conductive aluminum alloy by casting, and are distributed at two ends of the shaft, and are each in a shape of an annular cylindrical hole, a top of the annular cylindrical hole is provided with a respective one of the circular cones which is coaxial with the annular cylindrical hole and fixed by an upper support column and a lower support column, and the annular cylindrical hole, the respective one of the circular cones, the upper support column and the lower support column are integrally cast.

4. The integrated spraying pressure and flow detection device according to claim 1, wherein the first stepped hole has a diameter of 10 mm and a depth of 10 mm, the second stepped hole has a diameter of 9 mm and a depth of 4 mm, and while keeping a cylindrical part of each of the circular cones unchanged, an excess material is removed from a conical part of each of the circular cones during casting to reduce a weight of the integrated pressure and flow detection unit.

5. The integrated spraying pressure and flow detection device according to claim 1, wherein the preamplifier comprises a permanent magnet, an iron core, a coil, and an amplifying and shaping circuit which are integrally packaged, the preamplifier is connected to the integrated pressure and flow detection device housing through M15 threads in a middle of a bottom surface of the housing, and outputs, through a lead, electrical signals generated by periodically cutting magnetic lines of force, and four pins at a bottom end of the packaged preamplifier respectively correspond to a signal output, a power input, a shielding grid and an amplifier ground wire.

6. The integrated spraying pressure and flow detection device according to claim 1, wherein the control unit comprises a controller, an analog quantity acquisition module, a USB flash drive, a touch screen, a DC boost module and a 12V DC power supply; and the controller is connected to the analog quantity acquisition module, the touch screen and the DC boost module, the analog quantity acquisition module is connected to a pressure detection unit and a flow detection unit, the touch screen is connected to the USB flash drive, and the DC boost module is connected to the 12V DC power supply.

7. The integrated spraying pressure and flow detection device according to claim 1, wherein the calibration system comprises a one-way valve, a filter, a flow regulating valve, a proportional relief valve, a pressure regulating valve, a pump, a water tank, a nozzle, a solenoid valve, a measuring cylinder and an electronic balance;

the proportional relief valve, the pressure transmitter, the pump, the flow regulating valve and the solenoid valve are all connected to the control unit;

the water tank comprises a water outlet and a reflux inlet respectively provided at a bottom thereof and at a predetermined height position on a side thereof, and comprises a water feeding port provided right in a middle of a top thereof; the water tank is connected to a liquid inlet of the pump through the water outlet at the bottom, the filter is disposed between the water outlet at the bottom of the water tank and the pump, and the water tank is connected to the proportional relief valve through the reflux inlet on the side; a liquid outlet of the pump is connected to an end of the proportional relief valve and the pressure regulating valve respectively by pipelines; the pressure regulating valve is connected to a valve end of the flow regulating valve, and the pressure regulating valve is configured to control a pressure difference between the proportional relief valve and the flow regulating valve and keep a pressure of a liquid outputted from a fixed-difference relief valve at a constant value; the flow regulating valve is connected to the one-way valve; and a water inlet end of the integrated pressure and flow detection unit is connected to the pressure transmitter and the one-way valve, the other end of the integrated pressure and flow detection unit is connected to the solenoid valve, the solenoid valve is connected to the nozzle in series, the controller is configured to switch the solenoid valve on or off at a high speed to control a working status of the nozzle, the nozzle operates when the solenoid valve is switched on; the nozzle stops operating when the solenoid valve is switched off, and the measuring cylinder and the electronic balance are disposed below the nozzle.

8. A integrated spraying pressure and flow detection method, comprising the following steps:

step 1: acquisition of calibration data, comprising:

calibrating the integrated pressure and flow detection unit before being used to detect flow and pressure in a pipeline of a sprayer, wherein considering that pressure and flow ranges of a spraying agent are respectively 0.3-0.5 Mpa and 1-3 L/min during operation of the sprayer, operating ranges for pressure and flow of the spraying agent in the sprayer need to fall within calibration ranges selected during the calibration process, to ensure that the calibrated pressure and flow ranges meet operating requirements of the sprayer, where specific calibration steps comprise:

replacing a spraying agent in a spray boom with water, storing water in a water tank in advance, setting a proportional relief valve to 0.5 Mpa, water being driven by a pump to flow from the water tank into a main pipeline and then flow through a pressure regulating valve, a flow regulating valve, a one-way valve and the integrated pressure and flow detection unit, and adjusting the pressure regulating valve to change a pressure difference between two ends thereof, wherein the flow regulating valve is configured to change a flow rate of the water passing through the integrated pressure and flow detection unit in the pipeline to and keep at a stable value;

under a preset pressure condition, controlling the degree of opening of the flow regulating valve to gradually decrease from 100% to 10% at a step length of 5%, continuously spraying for 30 s at each degree of opening, and at the same time respectively using a 2000 mL measuring cylinder and an electronic balance precise to ±0.1 g to record a volume and mass of water sprayed from a nozzle, and recording a corresponding rectangular wave signal frequency f outputted from a preamplifier; in a similar way, controlling the degree of opening of the flow regulating valve to gradually increase from 10% to 100% at a step length of 5% and obtaining reverse stroke data; repeating the forward and reverse strokes three times respectively, recording data acquired, and storing the data in a USB flash drive;

at a preset degree of opening of the flow regulating valve, setting a maximum pressure of the proportional relief valve to 0.5 Mpa, manually adjusting the pressure regulating valve to gradually increase a set pressure value from 0.1 Mpa to 0.5 Mpa at a step length of 0.05 Mpa, and spraying for 30 s; in a similar way, setting a maximum pressure of the proportional relief valve to 0.5 Mpa, manually adjusting the pressure regulating valve to gradually decrease the set pressure value from 0.5 Mpa to 0.1 Mpa at a step length of 0.05 Mpa, and obtaining reverse stroke data; repeating the forward and reverse strokes three times respectively, so that an electrical signal outputted from a pressure detection unit in the integrated pressure and flow detection unit and values outputted from an already calibrated pressure transmitter are detected by changing the pressure in the pipeline under the same flow rate, and storing the data in the USB flash drive;

step 2: anti-interference processing and curve fitting of the calibration data of the integrated pressure and flow detection unit, involving the following process:

filtering and analyzing the data acquired in the step 1 by using limiting filtering, median filtering and moving average filtering methods, and removing singular value data that is acquired due to interference by vibration of a calibration system of the integrated pressure and flow detection unit, interference by instantaneous impact when a valve port is opened, interference by integrated installation of the pressure detection unit and a flow detection unit and other interference during the signal data acquisition process, to obtain reliable and real valid data;

recording a volume and mass of water sprayed from the nozzle to calculate a value of a flow Q in the pipeline in a case of continuously operating for 30 s, calculating a value of an instrument coefficient k according to a rectangular pulse wave signal frequency f outputted after anti-interference processing, so as to obtain a mathematical model of the rectangular wave signal frequency f outputted by the preamplifier and the flow Q in the pipeline, and storing the mathematical model in a controller;

using a least square method to eliminate a data signal detection error of the pressure transmitter on the integrated pressure and flow detection unit caused by the integrated installation of the pressure detection unit and the flow detection unit on the integrated pressure and flow detection unit, to obtain a mathematical model of the output signal of the integrated pressure and flow detection unit and the pressure in the spray boom pipeline, specifically implemented in the following manner:

assuming that an output value of the already calibrated pressure transmitter installed in the calibration pipeline is $Y_i$, wherein i=1, 2, ..., 150, wherein $Y_i$ is a pressure value in the sprayer pipeline that is outputted by the already calibrated pressure transmitter, and an electrical signal having been subjected to linear transformation and anti-interference processing that is outputted by the pressure detection unit in the integrated pressure and flow detection unit is $X_j$, wherein j=1, 2, ..., 1SO, fitting $Y_i$ and $X_j$ using a least square method, to establish a mathematical model of the electrical signal outputted by the pressure detection unit and the pressure value in the pipeline, and storing the mathematical model in the controller;

step 3: real-time acquisition of pressure and flow data in the sprayer pipeline, comprising:

installing the integrated pressure and flow detection unit in the boom sprayer pipeline, moving the sprayer to a crop field, turning on a control unit to start the spray boom to perform a spraying test at different spraying flow rates and spraying pressures, transmitting real-time data signals from the pressure detection unit and the flow detection unit to the controller through leads, storing data in the USB flash drive, and then performing anti-interference processing on the signal data stored in the USB flash drive;

step 4: anti-interference processing of the real-time detected pressure and flow data in the sprayer pipeline, comprising:

filtering and analyzing the data acquired in the step 3 by using limiting filtering, median filtering and moving average filtering methods, and removing singular value data that is acquired due to interference by vibration of the sprayer during field work, interference by shaking of the sprayer during traveling on uneven roads in the field and other interference, to obtain reliable and real valid data; and step 5: display and storage of the real-time detected pressure and flow data in the sprayer pipeline, comprising:

after the data having been subjected to anti-interference processing in the step 4 is sent to the control unit, calculating real-time pressure and flow data of the sprayer during field work according to the mathematical model of the output signal and the pressure and flow of the sprayer obtained by the calibration system, sending the real-time pressure and flow data to a touch screen for display, and storing the real-time data displayed in real time on the touch screen in the USB flash drive, for subsequent analysis of stability of the sprayer during field work after the operation is complete.

* * * * *